US009784153B2

(12) United States Patent
Okano et al.

(10) Patent No.: US 9,784,153 B2
(45) Date of Patent: Oct. 10, 2017

(54) ENGINE

(71) Applicant: KUBOTA Corporation, Osaka-shi, Osaka (JP)

(72) Inventors: Shunji Okano, Sakai (JP); Naoki Inoue, Sakai (JP); Tamotsu Ohashi, Sakai (JP); Hiroyuki Kawasoe, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 94 days.

(21) Appl. No.: 14/614,483

(22) Filed: Feb. 5, 2015

(65) Prior Publication Data
US 2015/0219041 A1 Aug. 6, 2015

(30) Foreign Application Priority Data

Feb. 6, 2014 (JP) ................. 2014-021411

(51) Int. Cl.
*F02F 1/42* (2006.01)
*F02M 61/14* (2006.01)
(Continued)

(52) U.S. Cl.
CPC ............ *F01N 1/083* (2013.01); *F01N 1/089* (2013.01); *F01N 3/2807* (2013.01);
(Continued)

(58) Field of Classification Search
CPC ....... F01N 3/28–3/2821; F01N 13/10–13/107; F01N 2230/04; F01N 1/089; Y02T 10/146; F02M 61/145
See application file for complete search history.

(56) References Cited

U.S. PATENT DOCUMENTS 3,556,735 A * 1/1971 Epelman ............. F01N 13/0097
181/231
3,927,525 A * 12/1975 Jacobs ...................... F01N 3/26
422/168
(Continued)

FOREIGN PATENT DOCUMENTS

JP H02135635 U 11/1990
JP H0240859 B2 * 12/1990 ........... F02D 41/345
(Continued)

OTHER PUBLICATIONS

English Human Translation of JP 02040859 B2.*
(Continued)

*Primary Examiner* — Jacob Amick
*Assistant Examiner* — Michael A Kessler
(74) *Attorney, Agent, or Firm* — Panitch Schwarze Belisario & Nadel LLP

(57) ABSTRACT

An engine capable of reducing the content of hydrocarbon in exhaust gas is provided. When viewed parallel to cylinder center axes, tangential virtual lines extending from endpoints of curved port central axes along tangent lines of the endpoints pass intake valve ports, straight port central axes extending from the endpoints of the curved port central axes are further away from a partition wall than the tangential virtual lines, and intake air bent through curved ports passes straight ports and is sucked through the intake valve ports along the wall between the cylinders.

18 Claims, 10 Drawing Sheets

(51) Int. Cl.
  *F02F 1/24* (2006.01)
  *F01N 1/08* (2006.01)
  *F02B 23/08* (2006.01)
  *F02B 31/02* (2006.01)
  *F01N 3/28* (2006.01)
  *F01N 13/10* (2010.01)

(52) U.S. Cl.
  CPC ......... *F01N 3/2885* (2013.01); *F01N 13/10* (2013.01); *F02B 23/08* (2013.01); *F02B 31/02* (2013.01); *F02F 1/42* (2013.01); *F02M 61/145* (2013.01); *F01N 2230/04* (2013.01); *F01N 2470/02* (2013.01); *Y02T 10/125* (2013.01); *Y02T 10/146* (2013.01)

(56) References Cited

U.S. PATENT DOCUMENTS

| | | | | |
|---|---|---|---|---|
| 4,520,776 A | * | 6/1985 | Ishida | F02B 31/08 123/308 |
| 4,951,642 A | * | 8/1990 | Hashimoto | F02B 23/08 123/193.5 |
| 5,426,084 A | * | 6/1995 | Fukaya | B01J 23/862 148/325 |
| 5,636,613 A | * | 6/1997 | Aoyama | F02B 31/087 123/432 |
| 7,296,560 B2 | * | 11/2007 | Inoue | F02D 41/345 123/336 |
| 8,997,724 B2 | * | 4/2015 | Nakashima | F02B 75/12 123/143 R |

FOREIGN PATENT DOCUMENTS

| | | | | | |
|---|---|---|---|---|---|
| JP | 07071224 A | * | 3/1995 | | F01N 1/08 |
| JP | 07071250 A | * | 3/1995 | | F01P 5/02 |
| JP | 07071313 A | * | 3/1995 | | F02F 1/42 |
| JP | H7102982 A | | 4/1995 | | |
| JP | 10089065 A | * | 4/1998 | | F01N 1/08 |
| JP | 10115268 A | * | 5/1998 | | F02F 1/242 |
| JP | 2000-097035 A | | 4/2000 | | |
| JP | 2002039017 A | * | 2/2002 | | F02M 19/00 |
| JP | 2006226281 A | * | 8/2006 | | F02M 69/04 |
| JP | 2009209846 A | * | 9/2009 | | F02D 41/22 |
| JP | 2009221918 A | * | 10/2009 | | F02D 9/10 |

OTHER PUBLICATIONS

Office Action issued Mar. 28, 2017 in JP Application No. 2014-021412.
Office Action issued Mar. 28, 2017 in JP Application No. 2014-021413.
English Translation Summary of Office Action in JP Application No. 2014-021412 issued Mar. 28, 2017 and Office Action in JP Application No. 2014-021413 issued Mar. 28, 2017.

* cited by examiner

ENGINE

BACKGROUND OF THE INVENTION (1) Field of the Invention

The present invention relates to an engine.

(2) Description of Related Art

According to the conventional art, the branched intake port is formed of a pair of S-shaped curved ports.

Problem

The content of hydrocarbon in exhaust gas may be large.

According to the conventional art, the content of hydrocarbon in the exhaust gas may be large.

The reason is as follows.

Most of intake air sucked through the intake valve ports is directed in a direction away from the wall between the cylinders and hits against intake air sucked through the intake valve ports along the wall between the cylinders, stagnating the flow of the intake air along the wall between the cylinders. As a result, heat of the high-temperature wall between the cylinders is not spread across the cylinders by swirls, suppressing vaporization of fuel and smooth flame propagation in a combustion chamber to cause incomplete combustion, thereby increasing the content of hydrocarbon in the exhaust gas.

SUMMARY OF THE INVENTION

An object of the present invention is to provide an engine capable of reducing the content of hydrocarbon in exhaust gas.

Matters used to define the invention are as follows.

In an engine in which a cylinder head includes combustion chamber roofs of adjacent cylinders, a branched intake port for introducing intake air into the adjacent cylinders, and intake valve ports provided at branched ends of the intake port, when viewed parallel to cylinder center axes, assuming a width direction of the cylinder head as a horizontal direction, a port inlet of the intake port is disposed just beside a partition wall for partitioning the combustion chamber roofs of the adjacent cylinders, port central axes of the intake port are disposed closer to the partition wall than a central virtual line of each cylinder, the central virtual line passing corresponding one of the cylinder center axes and extending horizontally, and the intake air is sucked through the intake valve ports along a wall between the cylinders, when viewed parallel to cylinder center axes, the intake port is configured of a pair of curved ports protrudingly curving in a direction away from the partition wall from the port inlet to the combustion chamber roofs, and a pair of straight ports extending straight toward the centers of the combustion chamber roofs from terminal ends of the curved ports to the intake valve ports at the combustion chamber roofs, when viewed parallel to cylinder center axes, tangential virtual lines extending from endpoints of the curved port central axes along tangent lines of the endpoints pass the intake valve ports, and straight port central axes extending from the endpoints of the curved port central axes are further away from the partition wall than the tangential virtual lines, and the intake air bent through the curved ports passes the straight ports, and is sucked through the intake valve ports along the wall between the cylinders.

The present invention achieves a following effect.

Effect

The content of hydrocarbon in exhaust gas can be reduced.

The content of hydrocarbon in exhaust gas can be reduced.

The reason is as follows.

Most of the intake air sucked through the intake valve ports is not directed in a direction away from the wall between the cylinders, and heat of the high-temperature wall between the cylinders is spread across the cylinders along the wall between the cylinders by swirls, promoting vaporization of fuel in each cylinder to prevent incomplete combustion, thereby reducing the content of hydrocarbon in exhaust gas.

Further, the smooth curved ports, short straight ports, and the intake valve ports away from the partition wall can reduce the flow resistance of the intake air into the cylinders, increase the flow rate of swirls along the wall between the cylinders, and vaporization of the fuel is promoted, resulting in that flame propagation in the combustion chamber is smoothly performed to prevent incomplete combustion and to reduce the content of hydrocarbon in the exhaust gas.

BRIEF DESCRIPTION OF THE DRAWINGS

FIG. 6A is a vertical sectional view of a cylinder head and its surroundings, and FIG. 6B is a view for illustrating a fuel injection timing;

DETAILED DESCRIPTION OF PREFERRED EMBODIMENTS

Figure 8:
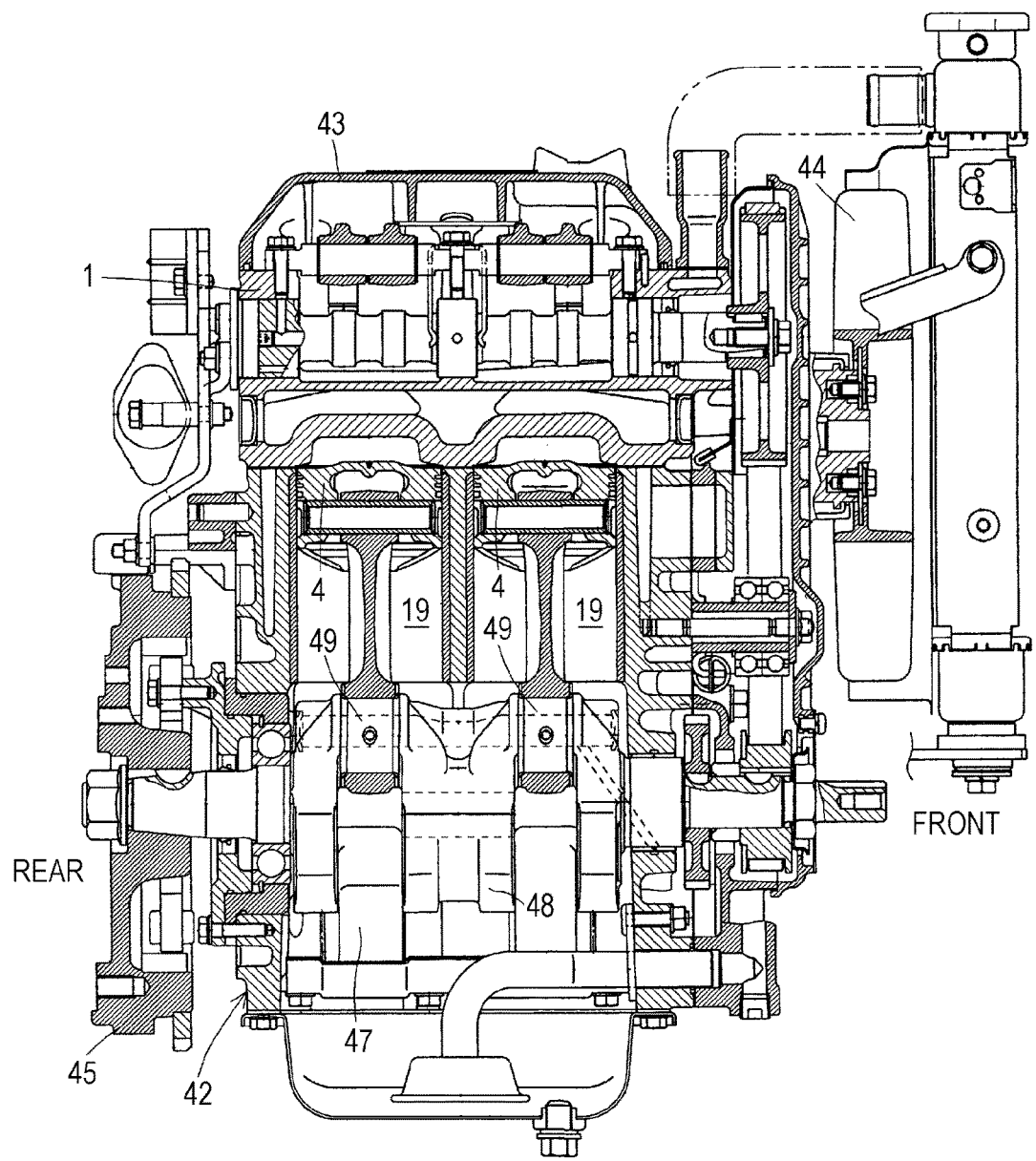
FIG. 8 is a vertical cross-sectional side view of the engine in FIG. 1.
Figure 9:
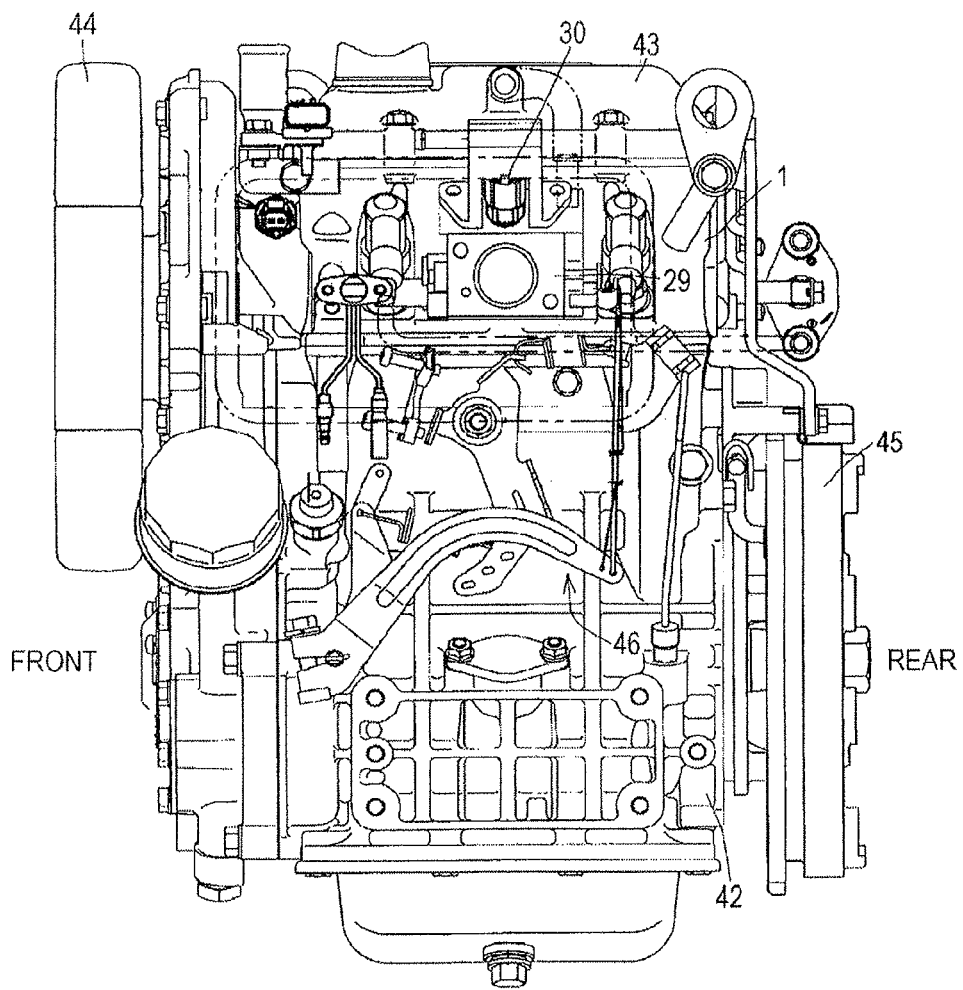
FIG. 9 is a side view of the engine in FIG. 1.
Figure 10:
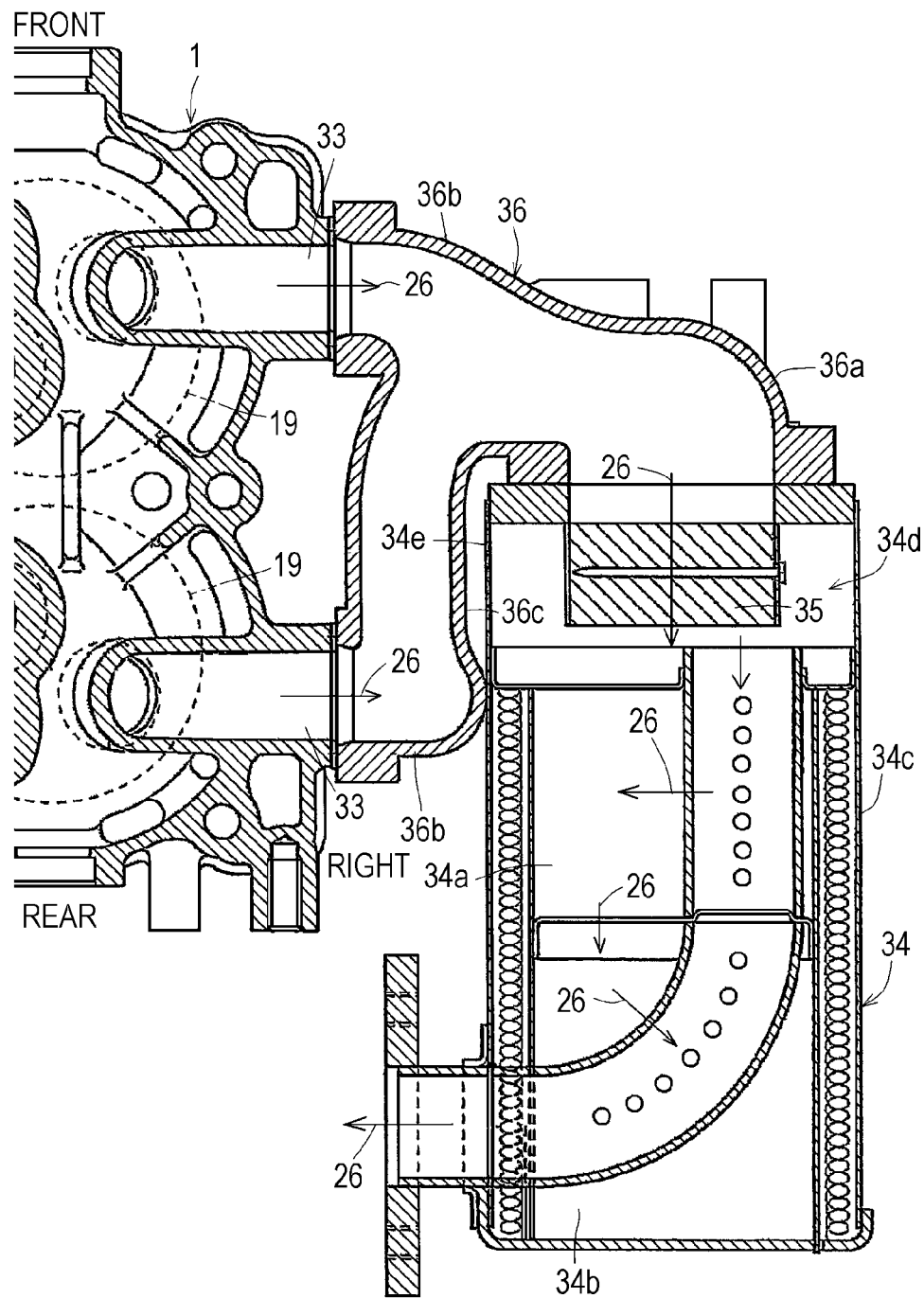
FIG. 10 is a view of an engine in accordance with Second embodiment of the present invention, which corresponds to FIG. 7.

FIG. 1 to FIG. 9 are views for illustrating a spark-ignition engine in accordance with First embodiment of the present invention, FIG. 10 is a view illustrating a spark-ignition engine in accordance with Second embodiment of the present invention, and in each embodiment, a water-cooled vertical straight two-cylinder gasoline engine is described.

First embodiment will be described below.

Summary of the engine is as follows.

As shown in FIG. 9, a cylinder head (1) is assembled to the upper part of a cylinder block (42), a cylinder head cover (43) is assembled to the upper part of the cylinder head (1), an engine cooling fan (44) is disposed in front of the cylinder block (42), and a flywheel (45) is disposed in the rear of the cylinder block (42).

A throttle body (29) is assembled to the left side surface of the cylinder head (1), a fuel injector (30) is assembled to the throttle body (29), and a mechanical governor (46) is disposed on the left side of the cylinder block (42). As shown in FIG. 8, the cylinder block (42) is provided with a pair of front and rear cylinders (19)(19), and a piston head (4) is fitted into each cylinder (19). A crank shaft (48) is mounted in a crank case (47) of the cylinder block (42), and the crank pin angle of a pair of front and rear crank pins (49)(49) of the crank shaft (48) is set to 360 degrees.

A combustion chamber is configured as follows.

Figure 1:
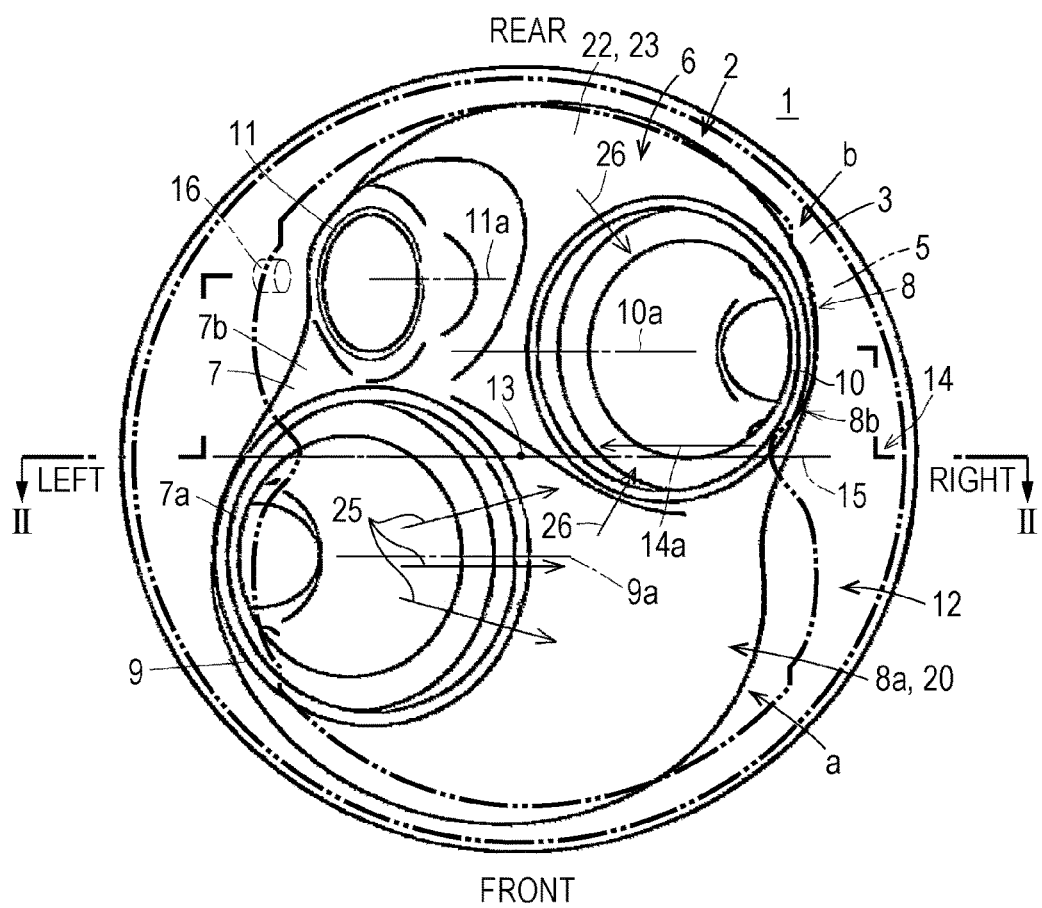
FIG. 1 is a view superimposing a piston head squish surface onto a bottom view of a combustion chamber roof and its surroundings of an engine in accordance with an embodiment of the present invention.
Figure 2:
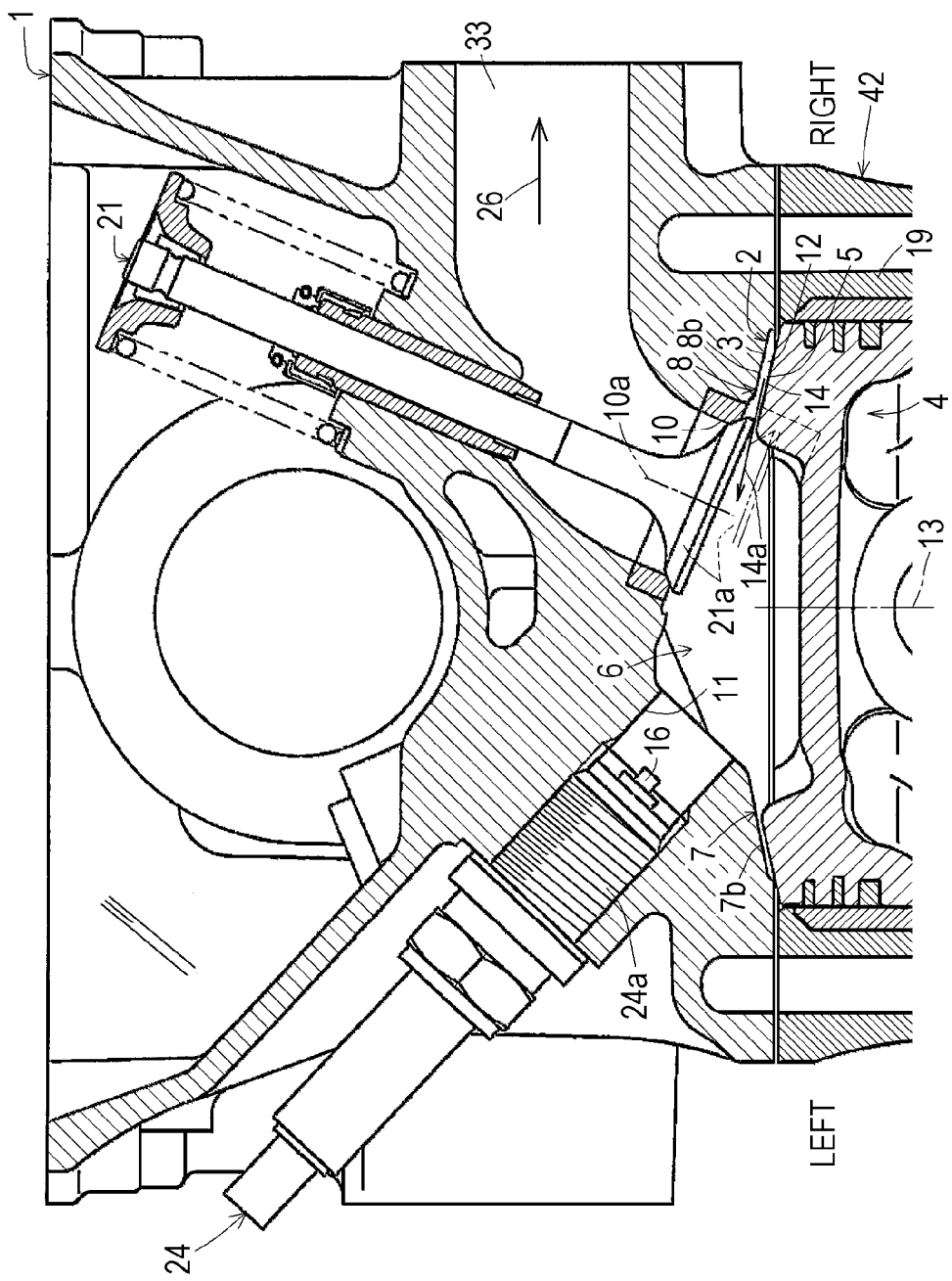
FIG. 2 is a sectional view taken along a line II-II in FIG. 1.
Figure 3:
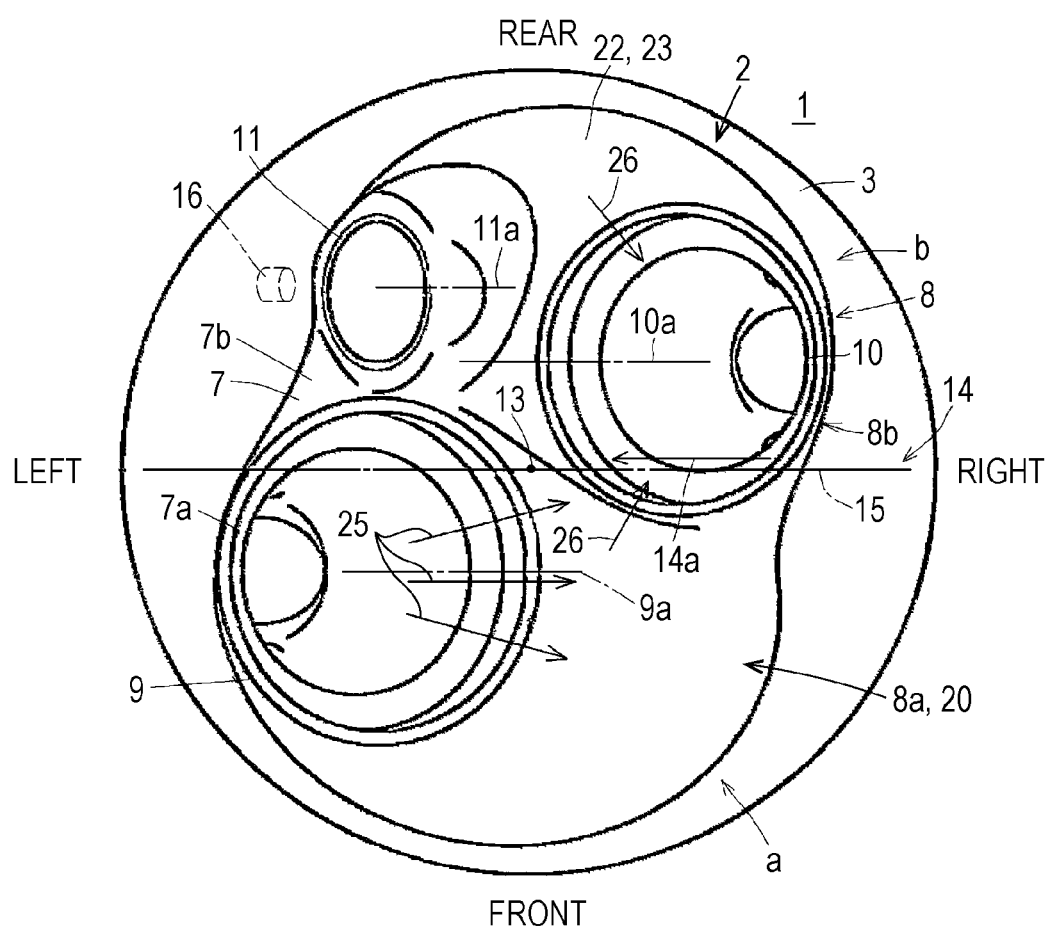
FIG. 3 is a bottom view of the combustion chamber roof and its surroundings of the engine in FIG. 1.

As shown in FIG. 1 and FIG. 2, there are provided a cylinder head-side squish surface (3) provided on the outer periphery of a combustion chamber roof (2) of the cylinder head (1), a piston head-side squish surface (5) provided on the outer periphery of the piston head (4) as opposed to the cylinder head-side squish surface (3), a combustion chamber recessed section (6) recessed at the center of the combustion chamber roof (2) of the cylinder head (1), and an intake valve port (9) provided on one opposed section (7) of opposed sections (7)(8) of the combustion chamber recessed section (6), an exhaust valve port (10) provided on the other opposed section (8), and a spark-plug attachment hole (11) facing the combustion chamber recessed section (6).

As shown in FIG. 2, the cylinder head-side squish surface (3) and the piston head-side squish surface (5) are upwardly inclined toward the combustion chamber recessed section (6), and in the vicinity of a compression top dead center, a squish flow is ejected from a squish area (12) formed between the cylinder head-side squish surface (3) and the piston head-side squish surface (5) toward the center of the combustion chamber recessed section (6).

Arrangement of a spark discharge section (16) at a tip of a spark plug (24) is as follows.

As shown in FIG. 1, when viewed parallel to a cylinder center axis (13), given a central virtual line (15) passing a squish area maximum-width section (14) and the center of the combustion chamber recessed section (6), and one area (a) and the other area (b) that are divided by the central virtual line (15), following configuration is realized.

The intake valve port (9) is provided in one area (7a) of any opposed section (7) of the opposed sections (7)(8) of the combustion chamber recessed section (6), and the spark-plug attachment hole (11) is provided in the other area (7b) of the opposed section (7), as shown in FIG. 1 and FIG. 10A, so that the spark discharge section (16) at the tip of the spark plug is provided at a position not to overlap the central virtual line (15) when viewed parallel to the cylinder center axis (13).

The exhaust valve port (10) may be provided at the position of the intake valve port (9).

Thus, the largest squish flow (14a) ejected from the squish area maximum-width section (14) in the vicinity of the compression top dead center does not directly hit against the spark discharge section (16) at the tip of the spark plug (24), resulting in that a small fire source occurred in the vicinity of the spark discharge section (16) immediately after ignition is hardly blown out by the largest squish flow (14a), and flame propagation in the combustion chamber is smoothly performed to prevent incomplete combustion and reduce the content of hydrocarbon in the exhaust gas (26).

The piston head (4) is configured as follows.

Figure 4:
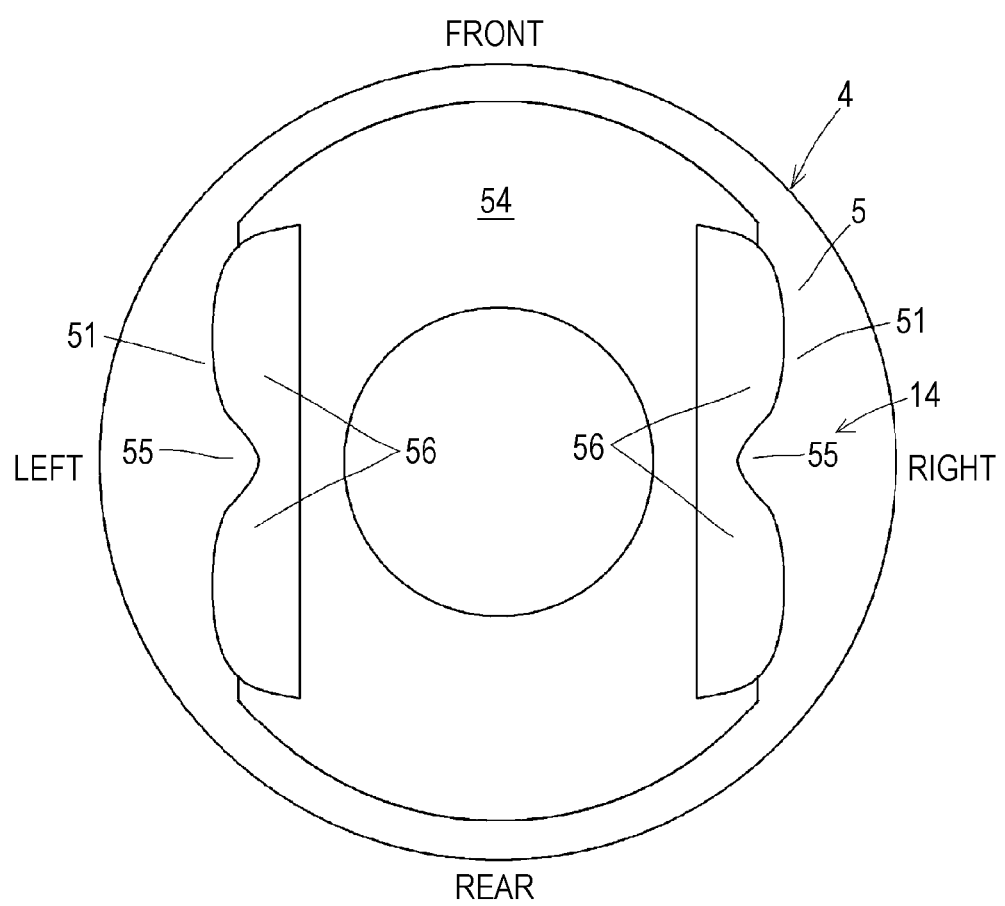
FIG. 4 is a plan view of a piston head used in the engine in FIG. 1.

As shown in FIG. 2, a cavity (54) is formed in the piston head (4), and as shown in FIG. 4, a pair of right and left protruding sections (55)(55) protruding from the center in the frontward and rearward direction toward the center of the cavity (54) are provided on right and left side walls (51)(51) of the cavity (54), and the squish area maximum-width section (14) is formed on the right protruding section (55) side. Recesses (56)(56) provided in front of and in the rear of each protruding section (55) are used as valve recesses for an intake valve (31) and an exhaust valve (21).

As shown in FIG. 2, the spark discharge section (16) is wholly disposed in the spark-plug attachment hole (11). The spark discharge section (16) may be partially disposed in the spark-plug attachment hole (11).

Thereby, the squish flow ejected from the squish area (12) in the vicinity of the compression top dead center is prevented from directly hitting against the spark discharge section (16) at the tip of the spark plug (24), resulting in that a small fire source occurred in the vicinity of the spark discharge section (16) immediately after ignition is hardly blown out by the squish flow, and flame propagation in the combustion chamber is smoothly performed to prevent incomplete combustion and reduce the content of hydrocarbon in the exhaust gas (26).

An intake guide surface (20) is configured as follows.

As shown in FIG. 1, the intake valve port (9) is provided in one area (7a) of one opposed section (7) of the combustion chamber recessed section (6), and the exhaust valve port (10) is provided in the other area (8b) of the other opposed section (8).

The one area (8a) of the other opposed section (8) serves as the intake guide surface (20), and the intake guide surface (20) has a center axis (9a) in common with the intake valve port (9), and is a partial circumferential surface of a conical frustum extending toward the cylinder (19).

Therefore, the intake air (25) sucked through the intake valve port (9) in the intake stroke smoothly flows into a combustion chamber recessed section (6) along the intake guide surface (20) to increase the intake efficiency, to prevent incomplete combustion and reduce the content of hydrocarbon in the exhaust gas (26).

Further, in a valve overlap period when an intake valve (31) and an exhaust valve (21) are opened in the vicinity of the exhaust top dead center, the exhaust gas (26) in the combustion chamber recessed section (6) is pushed into an exhaust valve port (10) by the intake air (25) guided from the intake valve port (9) to the exhaust valve port (10) along the intake guide surface (20) to increase the scavenging efficiency, to prevent incomplete combustion and reduce the content of hydrocarbon in the exhaust gas (26).

An exhaust guide surface (23) is configured as follows.

As shown in FIG. 1, when viewed parallel to the cylinder center axis (13), in the other area (b) located on one side of the central virtual line (15), the spark-plug attachment hole (11) is provided in one opposed section (7) of the combustion chamber recessed section (6), and the exhaust valve port (10) is provided in the other opposed section (8).

An end part (22) of the combustion chamber recessed section (6) located between the spark-plug attachment hole (11) and the exhaust valve port (10) has a center axis (10a) in common with the exhaust valve port (10), and serves as the exhaust guide surface (23) that is a partial circumferential surface of a conical frustum extending toward the cylinder (19).

Therefore, the exhaust gas (26) in the combustion chamber recessed section (6) is smoothly guided to the exhaust valve port (10) along the exhaust guide surface (23) in an exhaust stroke to increase the scavenging efficiency, to prevent incomplete combustion and reduce the content of hydrocarbon in the exhaust gas (26).

The spark-plug attachment hole (11) is a female screw hole, and a male screw (24a) of the spark plug (24) is screwed into the hole.

The largest squish flow (14a) is directed as follows.

As shown in FIG. 1, when viewed parallel to the cylinder center axis (13), the exhaust valve port (10) is provided in a position so as to overlap the central virtual line (15).

As shown in FIG. 2, the largest squish flow (14a) ejected from the squish area maximum-width section (14) in the vicinity of the exhaust top dead center is directed to the exhaust port opposing surface (21a) of the valve head of the opened exhaust valve (21).

Therefore, the exhaust gas (26) in the vicinity of the exhaust valve port (10) together with the largest squish flow (14a) hit against the exhaust port opposing surface (21a) of the valve head of the exhaust valve (21) and is reflected and enters into the exhaust valve port (10) to increase the scavenging efficiency, to prevent incomplete combustion and reduce the content of hydrocarbon in the exhaust gas (26).

An intake port (27) is configured as follows.

Figure 5:
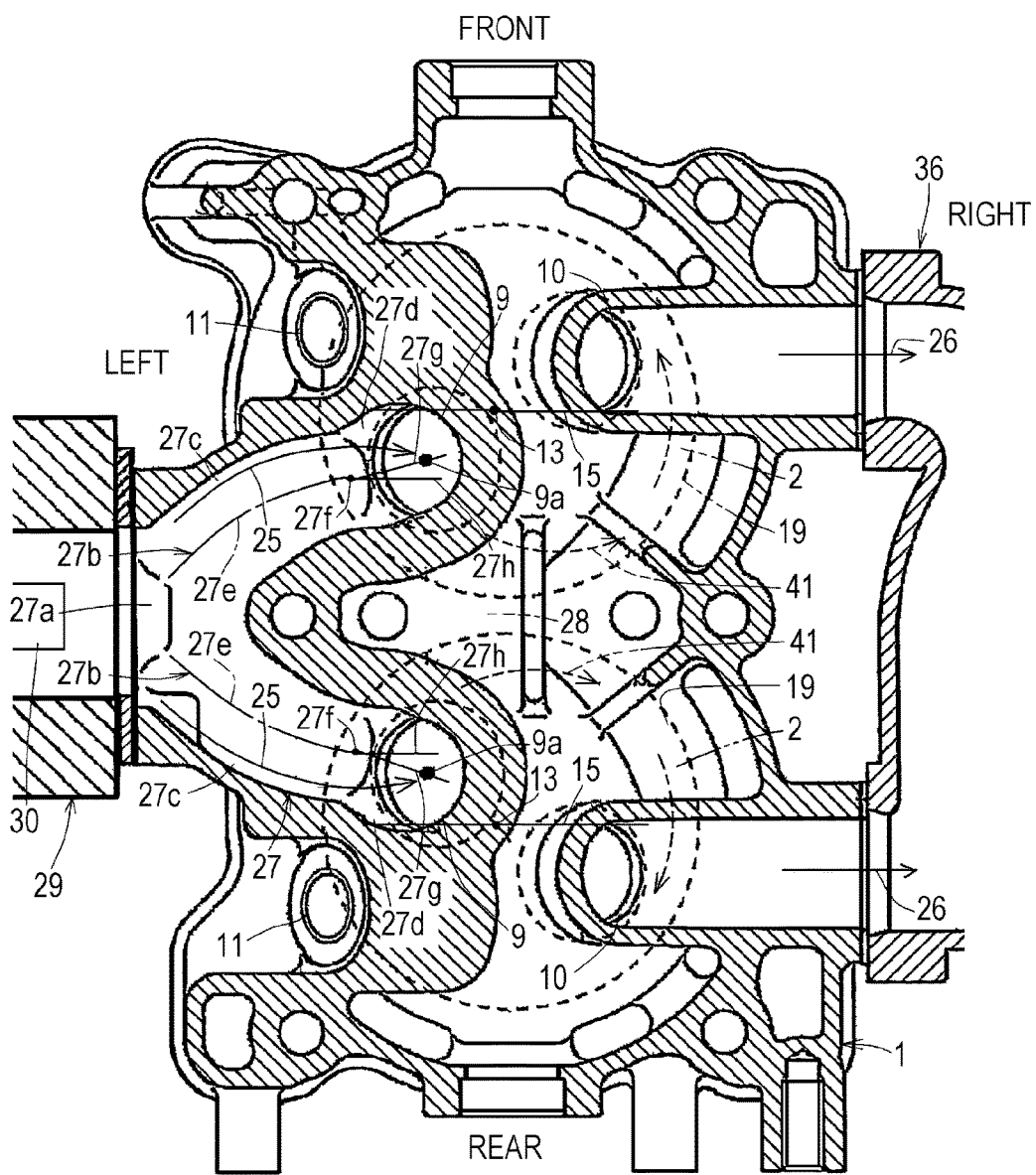
FIG. 5 is a horizontal cross-sectional plan view of a cylinder head and its surroundings of the engine in FIG. 1.
Figure 6:
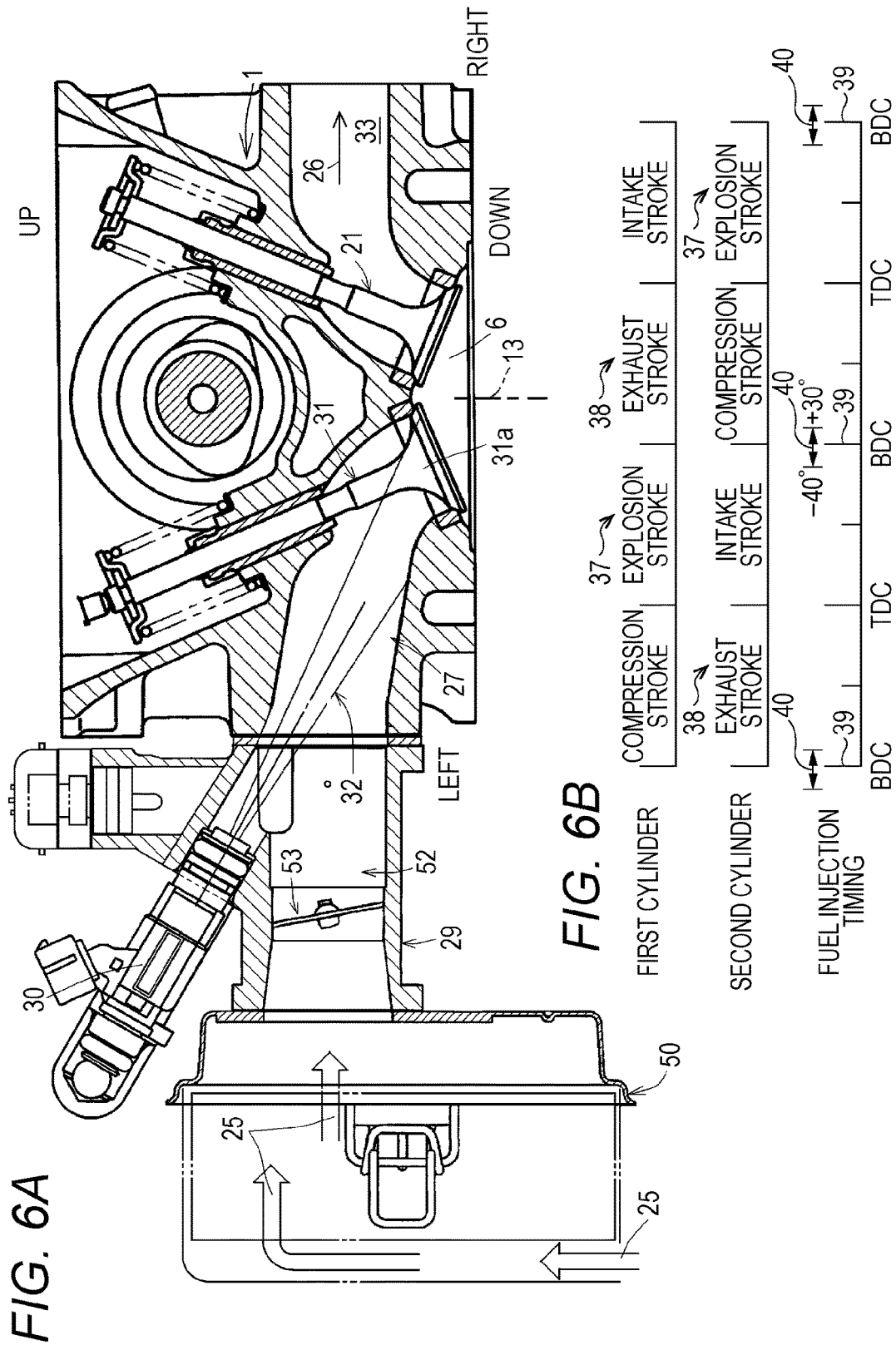
FIGS. 6A and 6B are views for illustrating the engine in FIG. 1.

As shown in FIG. 5, the cylinder head (1) includes combustion chamber roofs (2)(2) of the adjacent cylinders (19)(19), the branched intake port (27) for introducing intake air (25)(25) into the adjacent cylinders (19)(19), and the intake valve ports (9)(9) provided at branched ends of the intake port (27).

When viewed parallel to cylinder center axes (13)(13), assuming the width direction of the cylinder head (1) as the horizontal direction, a port inlet (27a) of the intake port (27) is disposed just beside a partition wall (28) partitioning the combustion chamber roofs (2)(2) of the adjacent cylinders (19)(19).

When viewed parallel to cylinder center axes (13)(13), port central axes (27b)(27b) of the intake port (27) are located closer to the partition wall (28) than the central virtual line (15) of each cylinder (19), the central virtual line passing corresponding one of the cylinder center axes (13)(13) and extending horizontally, and intake air (25)(25) is sucked through the intake valve ports (9)(9) along the wall between the cylinders.

As shown in FIG. 5, when viewed parallel to cylinder center axes (13)(13), the intake port (27) is configured of a pair of curved ports (27c)(27c) protrudingly curving in a direction away from the partition wall (28) from the port inlet (27a) to the combustion chamber roofs (2)(2), and a pair of straight ports (27d)(27d) extending straight toward the centers of the combustion chamber roofs (2)(2) from terminal ends of the curved ports (27c)(27c) to the intake valve ports (9)(9) at the combustion chamber roofs (2)(2).

When viewed parallel to the cylinder center axes (13)(13), tangential virtual lines (27h)(27h) extending from endpoints (27f)(27f) of respective curved port central axes (27e)(27e) along tangent lines of the endpoints (27f)(27f) pass the intake valve ports (9)(9), and straight port central axes (27g)(27g) extending from the endpoints (27f)(27f) of the respective curved port central axes (27e)(27e) are further away from the partition wall (28) than the respective tangential virtual lines (27h)(27h).

The intake air (25)(25) bent through the curved ports (27c)(27c) passes the straight ports (27d)(27d), and is sucked through the intake valve ports (9)(9) along the wall between the cylinders.

Therefore, most of the intake air (25)(25) sucked through the intake valve ports (9)(9) is not directed in a direction away from the wall between the cylinders, and heat of the high-temperature wall between the cylinders is spread across the cylinders (19)(19) along the wall between the cylinders by swirls, promoting vaporization of fuel in each cylinder (19) to prevent incomplete combustion, thereby reducing the content of hydrocarbon in exhaust gas (26).

Further, the smooth curved ports (27c)(27c), short straight ports (27d)(27d), and the intake valve ports (9)(9) away from the partition wall (28) can reduce the flow resistance of the intake air (25)(25) into the cylinders (19)(19), increase the flow rate of swirls (41)(41) along the wall between the cylinders, and vaporization of the fuel is promoted, resulting in that flame propagation in the combustion chamber is smoothly performed to prevent incomplete combustion and to reduce the content of hydrocarbon in the exhaust gas (26).

A position at which fuel (32) hits is as follows.

As shown in FIG. 6A, there are provided the throttle body (29) attached to the cylinder head (1), the fuel injector (30) attached to the throttle body (29), and the intake valve (31) provided in each intake valve port (9).

The intake valve (31) is a poppet valve, and the fuel (32) injected from the fuel injector (30) hits against the valve head (31a) of the intake valve (31). Therefore, vaporization of the fuel (32) is promoted by heat of the valve head (31a) of the intake valve (31) that absorbs combustion heat of the combustion chamber, preventing incomplete combustion to reduce the content of hydrocarbon in the exhaust gas (26).

An air intake device and a fuel injection device are configured as follows.

As shown in FIG. 5, when viewed parallel to the cylinder center axis (13), assuming that the arrangement direction of the two cylinders (19)(19) is the frontward and rearward direction, and the width direction of the cylinder head (1) orthogonal to the frontward and rearward direction is the horizontal direction, one throttle body (29) is used for the pair of adjacent front and rear cylinders (19)(19), the throttle body (29) is disposed lateral to (on the left side of) the cylinder head (1) and, as shown in FIG. 6A, the throttle body (29) is provided with one throttle intake passage (52) and one throttle valve (53).

As shown in FIG. 6A, one fuel injector (30) is attached to the throttle body (29).

Assuming that the direction of the cylinder center axis (13) is the vertical direction, the side of the cylinder head cover (43) is the upper side, and the side of the cylinder block (42) is the lower side, and as shown in FIG. 6A, when viewed parallel to the direction in which the crank shaft (48) is mounted, the fuel (32) is injected into the intake port (27) obliquely downward, and hits against the valve heads (31a) of a pair of intake valves (31) at the same time.

The injection timing of the fuel (32) is as follows.

As shown in FIG. 6B, the fuel (32) is injected from the fuel injector (30) into the intake port (27) within a crank angle range (40) from preceding 40 degrees to subsequent 30 degrees of a bottom dead center (39) partitioning an explosion stroke (37) and an exhaust stroke (38) of one cylinder (19).

Therefore, vaporization of the fuel (32) is promoted by heat of the valve head (31a) of the intake valve (31) that absorbs combustion heat and exhaust heat of the combustion chamber, preventing incomplete combustion to reduce the content of hydrocarbon in the exhaust gas (26).

The bottom dead center (39) partitions an intake stroke and a compression stroke of the other cylinder (19).

All or part of the fuel (32) may be injected within the crank angle range (40).

An exhaust treatment member (35) is configured as follows.

Figure 7:
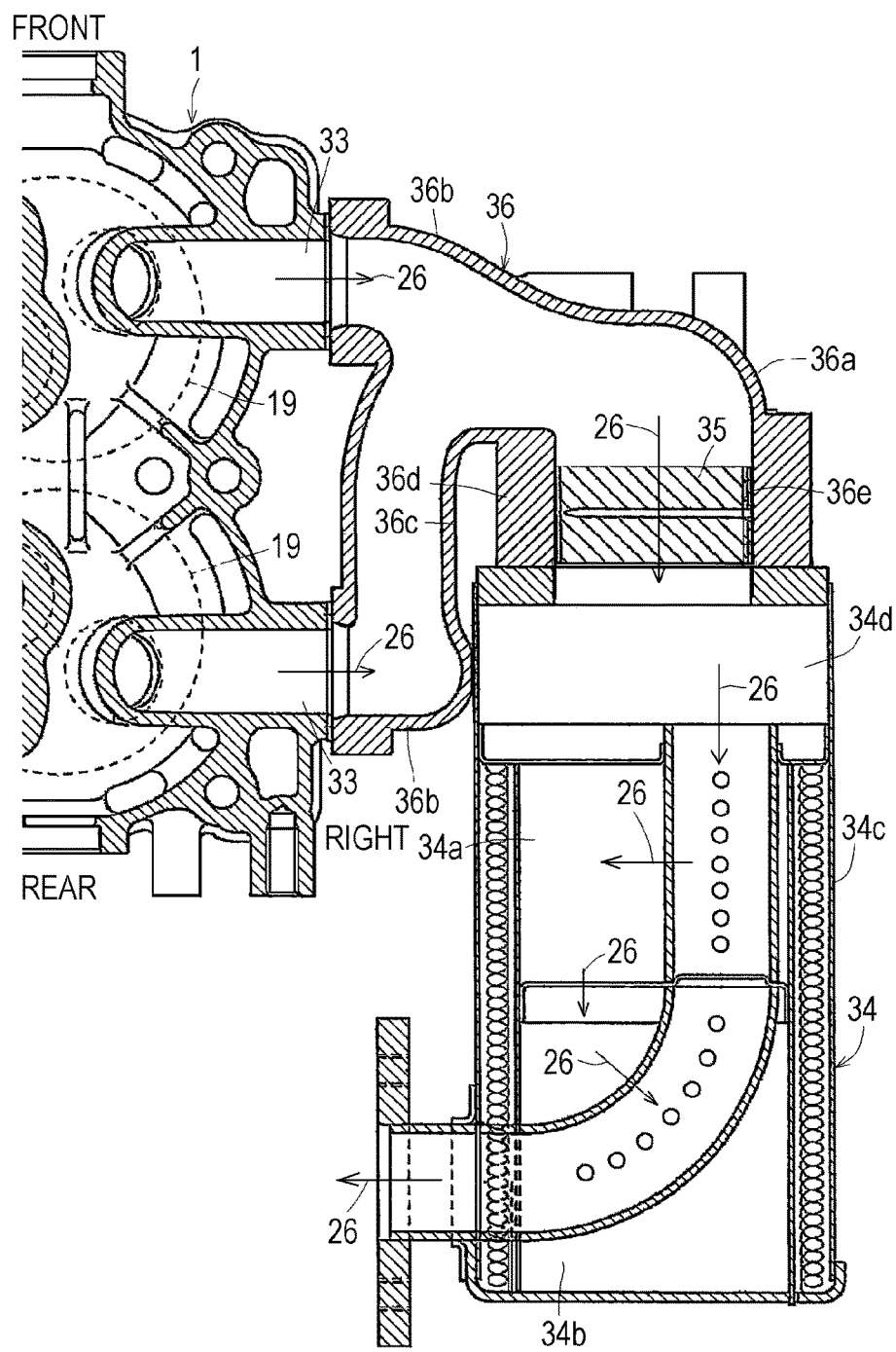
FIG. 7 is a horizontal cross-sectional plan view of a cylinder head, an exhaust manifold, and an exhaust muffler for use in the engine in FIG. 1.

As shown in FIG. 7, the engine includes an exhaust port (33), an exhaust muffler (34), and the exhaust treatment member (35) which are provided in the cylinder head (1).

The exhaust muffler (34) includes the muffling chambers (34a)(34b), and the exhaust treatment member (35) is disposed between the exhaust port (33) and the muffling chambers (34a)(34b), and is made of stainless steel such that the surface of a stainless steel material makes contact with the exhaust gas (26).

Therefore, the inexpensive exhaust treatment member (35) that does not require a catalyst component of precious metal can be adopted, reducing manufacturing costs of the engine.

Further, hydrocarbon in the exhaust gas (26) before entering into the muffling chambers (34a)(34b) burns on the surface of the stainless steel material with high-temperature exhaust heat to reduce the content of hydrocarbon in the exhaust gas (26).

Furthermore, the content of NOx (nitrogen oxides) in the exhaust gas (26) can be also reduced. It is due to that the surface of the stainless steel material serves as a reduction catalyst, NOx in the exhaust gas (26) is reduced on the surface of the stainless steel material by high-temperature exhaust heat to become nitrogen molecules, thereby clearing the exhaust gas (26).

As shown in FIG. 7, the engine includes an exhaust manifold (36) attached to the cylinder head (1), and the exhaust treatment member (35) is disposed in the exhaust manifold (36).

Therefore, the temperature of the exhaust gas (26) passing the exhaust treatment member (35) is high, thereby improving the hydrocarbon-burning function of the exhaust treatment member (35) to reduce the content of hydrocarbon in the exhaust gas (26).

Further, the content of NOx in the exhaust gas (26) can be reduced. It is due to that the temperature of the exhaust gas (26) passing the exhaust treatment member (35) is high, thereby improving the function of the exhaust treatment member (35) as a reduction catalyst.

The exhaust manifold (36) is configured with a collector section (36a) and a branch section (36b) branched from the collector section (36a) to the exhaust port (33) of each cylinder (19), and an exhaust outlet (36e) is provided at the terminating end of the collector section (36a).

An exhaust muffler body (34c) is long in the frontward and rearward direction, and includes an exhaust inlet (34d) at its front end, a first muffling chamber (34a), and a second muffling chamber (34b) in this order. The exhaust gas (26) passes through the exhaust inlet (34d), the first muffling chamber (34a), and the second muffling chamber (34b) of the exhaust muffler body (34c) in this order.

As shown in FIG. 7, the exhaust treatment member (35) is disposed in the collector section (36a) of the exhaust manifold (36).

Therefore, the exhaust treatment member (35) is disposed at the position where the exhaust gas (26) merges, and the temperature of the exhaust gas (26) passing the exhaust treatment member (35) is high to improve the hydrocarbon-burning function of the exhaust treatment member (35) and reduce the content of hydrocarbon in the exhaust gas (26).

Further, the content of NOx in the exhaust gas (26) can be reduced. It is due to that the temperature of the exhaust gas (26) passing the exhaust treatment member (35) is high, thereby improving the function of the exhaust treatment member (35) as a reduction catalyst.

As shown in FIG. 7, a circumferential wall (36d) of the collector section (36a) into which the exhaust treatment member (35) is incorporated is disposed along a circumferential wall (36c) of the branch section (36b) of the exhaust manifold (36).

Therefore, the heat-retaining property of the exhaust treatment member (35) is high, thereby improving the hydrocarbon-burning function of the exhaust treatment member (35) to reduce the content of hydrocarbon in the exhaust gas (26).

Further, the content of NOx in the exhaust gas (26) can be reduced. It is due to that the heat-retaining property of the exhaust treatment member (35) is high, thereby improving the function of the exhaust treatment member (35) as a reduction catalyst.

The exhaust treatment member (35) is disposed in the exhaust outlet (36e) of the collector section (36a) of the exhaust manifold (36).

The exhaust treatment member (35) is configured as follows.

In this embodiment, the exhaust treatment member (35) is formed of a three-dimensional mesh structure made of a stainless steel wire. That is, the exhaust treatment member (35) is formed of stainless steel wool.

Therefore, the surface area of the stainless steel material is large, thereby improving the hydrocarbon-burning function of the exhaust treatment member (35) to reduce the content of hydrocarbon in the exhaust gas (26).

Further, the content of NOx in the exhaust gas (26) can be reduced. It is due to that the surface area of the stainless steel material is large, thereby improving the function of the exhaust treatment member (35) as a reduction catalyst.

The exhaust treatment member (35) does not carry a catalyst component made of precious metal.

The exhaust treatment member (35) may be formed of a stainless steel honeycomb.

In that case, the surface area of the stainless steel material is large, thereby improving the exhaust-cleaning function of the exhaust treatment member (35) to reduce the content of hydrocarbon in the exhaust gas (26).

Further, the content of NOx in the exhaust gas (26) can be reduced. It is due to that the surface area of the stainless steel material is large, thereby improving the function of the exhaust treatment member (35) as a reduction catalyst.

Next, Second embodiment will be described.

As shown in FIG. 10, Second embodiment is different from First embodiment in that the exhaust treatment member (35) is disposed in the exhaust inlet (34d) of the exhaust muffler body (34c), and the circumferential wall (34e) of the exhaust inlet (34d) of the exhaust muffler body (34c) into which the exhaust treatment member (35) is incorporated is disposed along the circumferential wall (36c) of the branch section (36b) of the exhaust manifold (36).

The other configuration in Second embodiment is the same as that in First embodiment, and the same elements as those in First embodiment in FIG. 10 are given the same reference numerals.

In this embodiment, since the exhaust treatment member (35) is disposed in an exhaust inlet (34d) of an exhaust muffler body (34c), the temperature of the exhaust gas (26)

passing the exhaust treatment member (35) is high to improve the hydrocarbon-burning function of the exhaust treatment member (35) and reduce the content of hydrocarbon in the exhaust gas (26).

Further, the content of NOx in the exhaust gas (26) can be reduced. It is due to that the temperature of the exhaust gas (26) passing the exhaust treatment member (35) is high, thereby improving the function of the exhaust treatment member (35) as a reduction catalyst.

Furthermore, since the circumferential wall (34e) of the exhaust inlet (34d) of the exhaust muffler body (34c) into which the exhaust treatment member (35) is incorporated is disposed along the circumferential wall (36c) of the branch section (36b) of the exhaust manifold (36), the heat-retaining property of the exhaust treatment member (35) is high, thereby improving the hydrocarbon-burning function of the exhaust treatment member (35) to reduce the content of hydrocarbon in the exhaust gas (26).

Further, the content of NOx in the exhaust gas (26) can be reduced. It is due to that the heat-retaining property of the exhaust treatment member (35) is high, thereby improving the function of the exhaust treatment member (35) as a reduction catalyst.

Examples of stainless steel that can be preferably used for the exhaust treatment member (35) in each of the embodiments include SUS316 defined in JIS (Japanese Industrial Standards).

SUS316 is austenitic stainless steel and has elements (element composition) including, by weight %, C of 0.08 or less, Si of 1.00 or less, Mn of 2.00 or less, P of 0.045 or less, Ni of 10.00 to 14.00, Cr of 16.00 to 18.00, and Mo of 2.00 to 3.00.

However, the type of stainless steel that can be used according to the present invention is not limited to this, and may be any type as long as its surface makes contact with the exhaust gas, thereby reducing the contents of both hydrocarbon and NOx (nitrogen oxide) in exhaust gas.

What is claimed is:

1. A vertical, straight two-cylinder engine comprising:
   a cylinder head including combustion chamber roofs of the two adjacent cylinders,
   a branched intake port for introducing intake air into the adjacent cylinders,
   intake valve ports provided at branched ends of the intake port, an intake poppet valve provided in each intake valve port and intake air being sucked through the intake valve ports along a wall between the cylinders,
   one throttle body attached to the cylinder head,
   one fuel injector attached to the one throttle body, and
   a pair of crank pins having a crank pin angle set to 360 degrees,
   wherein:
   when viewed parallel to cylinder center axes, assuming a width direction of the cylinder head as a horizontal direction, a port inlet of the intake port is disposed just beside a partition wall for partitioning the combustion chamber roofs of the adjacent cylinders, port central axes of the intake port are disposed closer to the partition wall than a central virtual line of each cylinder, the central virtual line passing corresponding one of the cylinder center axes and extending horizontally,
   when viewed parallel to the cylinder center axes, the intake port comprises a pair of curved ports protrudingly curving in a direction away from the partition wall, extending from the port inlet and terminating atop the cylinders, and a corresponding pair of straight ports extending straight in a direction toward the centers of the combustion chamber roofs, from terminal ends of the curved ports to the intake valve ports at the combustion chamber roofs,
   when viewed parallel to the cylinder center axes, tangential virtual lines extending from endpoints of curved port central axes along tangent lines of the endpoints pass the intake valve ports, and straight port central axes extending from the endpoints of the curved port central axes are further away from the partition wall than the tangential virtual lines,
   such that the intake air bent through the curved ports passes the straight ports, and is sucked through the intake valve ports along the wall between the cylinders,
   wherein fuel injected from the one fuel injector hits directly against a valve head of each intake valve at the same time, and the fuel is injected from the fuel injector to the intake port within a crank angle range from preceding 40 degrees to subsequent 30 degrees of a bottom dead center, partitioning an explosion stroke and an exhaust stroke of one cylinder and partitioning an intake stroke and a compression stroke of another cylinder at the same time.

2. The engine according to claim 1, further comprising a combustion chamber recessed section recessed at a center of the combustion chamber roof of the cylinder head, wherein
   when viewed parallel to the cylinder center axis, given the central virtual line passing a center of the combustion chamber recessed section and one area and the other area that are divided by the central virtual line,
   the intake valve port is provided in one area of one opposed section of the combustion chamber recessed section, and an exhaust valve port is provided in the other area of the other opposed section,
   one area of the other opposed section serves as an intake guide surface, and the intake guide surface has a center axis in common with the intake valve port, and is a partial circumferential surface of a conical frustum extending toward a cylinder.

3. The engine according to claim 2, wherein
   when viewed parallel to the cylinder center axis, in the other area located on one side of the central virtual line, a spark-plug attachment hole is provided in one opposed section of the combustion chamber recessed section, and the exhaust valve port is opened to the other opposed section, and
   an end part of the combustion chamber recessed section located between the spark-plug attachment hole and the exhaust valve port has a center axis in common with the exhaust valve port, and serves as an exhaust guide surface that is a partial circumferential surface of a conical frustum extending toward the cylinder.

4. The engine according to claim 1, wherein a largest squish flow ejected from a squish area maximum-width section in the vicinity of the exhaust top dead center is directed to an exhaust port opposing surface of a valve head of an opened exhaust valve.

5. The engine according to claim 1, further comprising:
   an exhaust port provided in the cylinder head;
   an exhaust muffler; and
   an exhaust treatment member, wherein
   the exhaust muffler includes muffling chambers, and the exhaust treatment member is disposed between the exhaust port and the muffling chambers and is made of stainless steel such that the surface of a stainless steel material makes contact with exhaust gas.

6. The engine according to claim 5, further comprising an exhaust manifold attached to the cylinder head, wherein the exhaust treatment member is disposed in the exhaust manifold.

7. The engine according to claim 6, wherein the exhaust treatment member is disposed in a collector section of the exhaust manifold.

8. The engine according to claim 7, wherein a circumferential wall of the collector section into which the exhaust treatment member is incorporated is disposed along a circumferential wall of a branch section of the exhaust manifold.

9. The engine according to claim 5, wherein the exhaust treatment member is disposed in an exhaust inlet of an exhaust muffler body.

10. The engine according to claim 9, further comprising an exhaust manifold attached to the cylinder head, wherein a circumferential wall of the exhaust inlet of the exhaust muffler body into which the exhaust treatment member is incorporated is disposed along a circumferential wall of a branch section of the exhaust manifold.

11. The engine according to claim 5, wherein the exhaust treatment member is formed of a three-dimensional mesh structure made of a stainless steel wire.

12. The engine according to claim 5, wherein the exhaust treatment member is formed of a stainless steel honeycomb.

13. The engine according to claim 2, wherein a largest squish flow ejected from a squish area maximum-width section in the vicinity of the exhaust top dead center is directed to an exhaust port opposing surface of a valve head of an opened exhaust valve.

14. The engine according to claim 2, further comprising:
an exhaust port provided in the cylinder head;
an exhaust muffler; and
an exhaust treatment member, wherein
the exhaust muffler includes muffling chambers, and the exhaust treatment member is disposed between the exhaust port and the muffling chambers and is made of stainless steel such that the surface of a stainless steel material makes contact with exhaust gas.

15. The engine according to claim 13, wherein
when viewed parallel to the cylinder center axis, in the other area located on one side of the central virtual line, a spark-plug attachment hole is provided in one opposed section of the combustion chamber recessed section, and the exhaust valve port is opened to the other opposed section, and
an end part of the combustion chamber recessed section located between the spark-plug attachment hole and the exhaust valve port has a center axis in common with the exhaust valve port, and serves as an exhaust guide surface that is a partial circumferential surface of a conical frustum extending toward the cylinder.

16. The engine according to claim 14, wherein
when viewed parallel to the cylinder center axis, in the other area located on one side of the central virtual line, a spark-plug attachment hole is provided in one opposed section of the combustion chamber recessed section, and the exhaust valve port is opened to the other opposed section, and
an end part of the combustion chamber recessed section located between the spark-plug attachment hole and the exhaust valve port has a center axis in common with the exhaust valve port, and serves as an exhaust guide surface that is a partial circumferential surface of a conical frustum extending toward the cylinder.

17. The engine according to claim 14, wherein a largest squish flow ejected from a squish area maximum-width section in the vicinity of the exhaust top dead center is directed to an exhaust port opposing surface of a valve head of an opened exhaust valve.

18. The engine according to claim 15, further comprising:
an exhaust port provided in the cylinder head;
an exhaust muffler; and
an exhaust treatment member, wherein
the exhaust muffler includes muffling chambers, and the exhaust treatment member is disposed between the exhaust port and the muffling chambers and is made of stainless steel such that the surface of a stainless steel material makes contact with exhaust gas.

* * * * *